United States Patent
Pforte et al.

(10) Patent No.: US 11,269,293 B2
(45) Date of Patent: *Mar. 8, 2022

(54) MULTI-LAYER BODY AND METHOD FOR THE PRODUCTION THEREOF

(71) Applicant: LEONHARD KURZ Stiftung & Co. KG, Furth (DE)

(72) Inventors: Klaus Pforte, Oberasbach (DE); Ludwig Brehm, Adelsdorf (DE)

(73) Assignee: LEONHARD KURZ STIFTUNG & CO. KG, Furth (DE)

( * ) Notice: Subject to any disclaimer, the term of this patent is extended or adjusted under 35 U.S.C. 154(b) by 167 days.

This patent is subject to a terminal disclaimer.

(21) Appl. No.: 16/663,503

(22) Filed: Oct. 25, 2019

(65) Prior Publication Data

US 2020/0057410 A1 Feb. 20, 2020

Related U.S. Application Data

(63) Continuation of application No. 15/525,436, filed as application No. PCT/EP2015/077087 on Nov. 19, 2015, now Pat. No. 10,488,819.

(30) Foreign Application Priority Data

Nov. 19, 2014 (DE) ..................... 102014116940.9

(51) Int. Cl.
| | |
|---|---|
| *G03H 1/00* | (2006.01) |
| *B42D 25/351* | (2014.01) |
| *G03H 1/02* | (2006.01) |
| *B42D 25/328* | (2014.01) |
| *B42D 25/324* | (2014.01) |

(Continued)

(52) U.S. Cl.
CPC ......... *G03H 1/0011* (2013.01); *B42D 25/324* (2014.10); *B42D 25/328* (2014.10); *B42D 25/351* (2014.10); *B42D 25/364* (2014.10); *B42D 25/378* (2014.10); *G03H 1/0244* (2013.01); *G03H 1/0248* (2013.01); *G03H 1/0256* (2013.01); *G03H 2001/0264* (2013.01); *G03H 2001/2635* (2013.01); *G03H 2223/12* (2013.01); *G03H 2223/19* (2013.01); *G03H 2223/25* (2013.01); *G03H 2250/10* (2013.01); *G03H 2250/12* (2013.01); *G03H 2250/33* (2013.01); *G03H 2250/34* (2013.01); *G03H 2250/38* (2013.01); *G03H 2250/40* (2013.01); *G03H 2250/42* (2013.01)

(58) Field of Classification Search
None
See application file for complete search history.

(56) References Cited

U.S. PATENT DOCUMENTS

| | | |
|---|---|---|
| 7,224,528 B2 | 5/2007 | Phillips et al. |
| 7,892,639 B2 | 2/2011 | Mess et al. |
| | (Continued) | |

FOREIGN PATENT DOCUMENTS

| | | |
|---|---|---|
| EP | 2458452 | 5/2012 |
| JP | 2001293982 | 10/2001 |
| WO | WO2013110565 | 8/2013 |

*Primary Examiner* — David R Dunn
*Assistant Examiner* — Christopher E Veraa
(74) *Attorney, Agent, or Firm* — Hoffmann & Baron, LLP (57) ABSTRACT

A security document having a security element including a multilayer body with a volume hologram layer and a partial opaque layer, arranged on a surface of the volume hologram layer, which is present in a first area and is not present in a second area.

17 Claims, 3 Drawing Sheets

(51) Int. Cl.
*B42D 25/364* (2014.01)
*B42D 25/378* (2014.01)
*G03H 1/26* (2006.01)

(56) References Cited

U.S. PATENT DOCUMENTS

| | | | |
|---|---|---|---|
| 8,119,323 | B2 | 2/2012 | Fukui et al. |
| 8,534,708 | B2 | 9/2013 | Heim et al. |
| 8,684,415 | B2 | 4/2014 | Commander et al. |
| 2007/0089831 | A1 | 4/2007 | Florentino et al. |
| 2009/0251749 | A1 | 10/2009 | O'Boyle et al. |
| 2012/0170124 | A1 | 7/2012 | Fuhse et al. |
| 2012/0286504 | A1 | 11/2012 | Oikawa et al. |
| 2014/0002873 | A1 | 1/2014 | Tompkin et al. |
| 2014/0042738 | A1 | 2/2014 | Power et al. |
| 2014/0333058 | A1 | 11/2014 | Tremolada et al. |
| 2015/0018206 | A1 | 1/2015 | Scheuer |
| 2015/0036198 | A1 | 2/2015 | Inokuchi |
| 2015/0185387 | A1 | 7/2015 | Amimori et al. |
| 2015/0298484 | A1 | 10/2015 | Motoi et al. |

MULTI-LAYER BODY AND METHOD FOR THE PRODUCTION THEREOF

This application is a continuation application of U.S. application Ser. No. 15/525,436, filed May 9, 2017, which claims priority based on an International Application filed under the Patent Cooperation Treaty, PCT/EP2015/077087, filed on Nov. 19, 2015, and German Application No. DE 102014116940.9, filed on Nov. 19, 2014.

BACKGROUND OF THE INVENTION

The invention relates to a multilayer body, a method for the production thereof, a security element with such a multilayer body and a security document with a security element of this type.

Holograms are used as security elements to protect security documents such as banknotes, money substitutes, credit cards, passports or ID documents, as well as for product security. In the case of mass-produced goods surface holograms are often used which can achieve interesting optically variable effects, for example movement effects, and are characterized by a high luminous intensity.

In contrast to surface holograms, volume holograms, also called white-light holograms, are based on light diffraction at the Bragg planes inside a transparent layer which thereby has local differences in refractive index.

A surface relief can be used as the master to produce a multilayer body which contains a volume hologram. The front of the master is brought, directly or with a transparent optical medium interposed, into contact with a photosensitive layer of the multilayer body in which the volume hologram is to be drawn. The master is then illuminated with coherent light through the photosensitive layer, wherein by overlaying the light irradiated onto the master and the light diffracted by the master an interference pattern forms which is recorded in the photosensitive layer as a volume hologram. The volume hologram thus introduced into the photosensitive layer is then fixed after curing of the photosensitive layer. Through a specific design of the master, two or more separate items of image information can here be inscribed into the photosensitive layer.

Volume holograms generally have a high transparency and should therefore be applied to dark backgrounds in order to guarantee a good visibility or a high brilliance of the optical effects. This often makes expensive preparation work necessary on the substrates to which such security elements are to be applied.

SUMMARY OF THE INVENTION

The object of the invention is now to indicate an improved multilayer body as well as a method for the production thereof. The object of the invention is furthermore to indicate a security element and security document with such a multilayer body.

According to the invention this object is achieved with the subject of claims 1, 36, 41 and 42.

Such a multilayer body comprises a volume hologram layer and a partial opaque layer, arranged on one of the surface of the volume hologram layer, which is present in a first area and is not present in a second area.

A multilayer body of this type can be obtained by a method with the steps:
providing a volume hologram layer,
applying a partial opaque layer to a surface of the volume hologram layer,
wherein the partial opaque layer is applied in a first area and is not applied in a second area.

A multilayer body obtained in this way can be used as a security element to authenticate security documents such as banknotes, securities, identification documents, driver's licenses, credit cards, passport or visa documents.

The multilayer body furthermore preferably comprises a decorative ply, wherein the partial opaque layer is arranged between the decorative ply and the volume hologram layer.

Alternatively or in addition, a decorative ply can also be provided on a substrate of a security document, wherein a security element based on the described multilayer body is applied to the decorative ply of the substrate.

In both cases the respective decorative plies have comparable properties and achieve the same optical effect. Thus where the properties of the decorative ply are explained in the following, this relates both to decorative plies integrated into the multilayer body and to decorative plies which are provided on a substrate of a security document separately from the multilayer body.

A security element can be, for example, a laminating film, an embossing film, an adhesive film or the like, by which the multilayer body can be transferred onto an object. Security strips, security threads, security windows or the like for integration into documents are also conceivable.

As already mentioned, known multilayer bodies with volume holograms are always transparent and should be applied to a dark background for an advantageous brilliance of the optical effects, with the result that expensive preliminary work is necessary, such as e.g. dyeing, printing, coating on the substrate. This is no longer necessary in the case of the described multilayer body. Because of the partial opaque layer such a multilayer body can be applied to any backgrounds without the optical quality of the multilayer body being adversely affected. Preparation of the background can thus be dispensed with, with the result that further processing of the multilayer body is simplified.

Furthermore, in this way, the protection against forgery of security elements obtained in this way is increased because the interaction of the components of the multilayer body, thus of volume hologram, opaque layer and decorative ply, is accordingly difficult to forge or increases the effort of forging.

An area can be coherent, but can also be formed of a plurality of non-coherent partial areas.

An opaque area is an area with a transmissivity in the wavelength range of light visible to the human observer of less than 40%, preferably of less than 30%, particularly preferably of less than 20%.

A transparent area is an area with a transmissivity in the wavelength range of light visible to the human observer of more than 50%, preferably of more than 70%, particularly preferably of more than 80%.

It is preferred if the opaque layer has a luminance L* in the CIELAB color space of from 0 to 50, preferably from 0 to 30.

The luminance L* of the opaque layer used is determined in particular by means of the CIELAB Datacolor SF 600 measuring system, which is based on a spectrophotometer. In the colorimetric determination of color differences in body colors according to the CIELAB formula L*a*b*, the value L* represents the light/dark axis, the value a* represents the red/green axis and the value b* represents the yellow/blue axis. The L*a*b* color space is thus described as a three-dimensional coordinate system, wherein the L* axis describes the lightness and can adopt a value between 0 and 100.

The measurement of the lightness L* preferably takes place under the following conditions:
Measurement geometry: diffuse/8° according to DIN 5033 and ISO 2496
Diameter of measurement opening: 9 mm
Spectral range: 360 nm to 700 nm according to DIN 6174
Standard illuminant: D65

It is furthermore preferred if the first area of the opaque layer covers 1% to 99%, preferably 50% to 95% of the volume hologram layer.

The named coverage relates to the surface area spanned by the volume hologram layer when observed in the direction of the surface normals. The advantageous areas were able to be determined experimentally.

If the surface coverage is very high, only very small areas of the further layer are visible, which can be meaningful depending on the design.

If the surface coverage is relatively low, larger areas of the further layer are visible. Depending on the lightness of the further layer and its contrast to the dark layer, this can be meaningful in other design variants.

If the contrast between the opaque layer and the decorative ply is very strong, i.e. if the decorative ply is comparatively light and/or strongly reflective, it is advantageous to increase the surface coverage of the opaque layer in order to limit an optical blooming of the volume hologram by the decorative ply.

If the contrast between the opaque layer and the decorative ply is less strong, i.e. if the decorative ply is comparatively less light and/or less reflective, it is possible to reduce the surface coverage of the opaque layer a little, because a sufficiently good visibility of the volume hologram is nevertheless still made possible.

It is also possible for the opaque layer and the decorative ply to be collectively omitted in particular areas in order to leave the volume hologram transparent in these areas and to make an optionally light background of the substrate (e.g. white paper or plastic) visible. For example, the optical effect of the volume hologram in these omitted areas can thus be intentionally weakened or the brilliance can be reduced in order to produce specific optical effects. In particular the directly neighboring and register-accurate or positionally accurate presence of optical effects with high brilliance (with dark opaque layer and decorative ply) and optical effects with lower brilliance can produce an optical impression that is distinctive and at the same time difficult to forge.

It is also possible for the decorative ply to be omitted in the second areas of the opaque layer in which the opaque layer is not present, in order to leave the substrate visible in these areas. In other words, the substrate forms the background for the volume hologram. If, for example, the substrate is light, in particular white, paper or plastic, the brilliance of the volume hologram is accordingly lowered or reduced.

However, the substrate can also already have color layers or other decorative layers, which are then at least partially visible through the second areas of the opaque layer and through the transparent volume hologram and likewise form a background for the volume hologram. Due to the substrate shining through the second areas of the opaque layer, optical effects that are distinctive and at the same time difficult to forge can in turn be produced.

The opaque layer expediently comprises at least one dye, pigment or effect pigment.

In addition to the desired opacity, color effects can thus also be realized. The named constituents of the opaque layer can also be combined in order thus to obtain complex decorations which are to be imitated only with difficulty and guarantee a high degree of protection against forgery.

It is furthermore expedient if the opaque layer comprises a thermoplastic varnish.

This acts as a matrix for the pigments and/or dyes determining the opacity.

The opaque layer preferably has a layer thickness of from 1 μm to 5 μm, preferably from 1 μm to 3 μm.

It is furthermore expedient if the first and/or second area forms at least graphic element, in particular a motif, an image, a symbol, a logo and/or an alphanumeric character.

This graphic element contributes to the overall design of the multilayer body and thus increases the protection against forgery. Depending on the relative arrangement and formation of the layers, this element can be visible together with the volume hologram or can be visible independently of this depending on the angle of observation.

The graphic element preferably comprises an endless motif and/or an individual image motif.

The graphic element can be arranged registered, i.e. positionally accurate, relative to a graphic element of the volume hologram layer.

The openings in the opaque layer in the second area are thus either a continuous endless pattern or an individual image decoration or a combination thereof. The openings can (but need not) be arranged registered, i.e. positionally accurate, relative to the motif of the volume hologram.

The volume hologram can, for its part, likewise have either a continuous endless pattern or an individual image decoration or a combination thereof.

Thus, for example, two endless designs can be randomly superimposed out of register and form a common endless design, for example leaves and flowers. The superimposition can also take place registered, i.e. with exact allocation/position, for example leaves and flowers with the flowers in each case exactly at open spaces between the leaves.

An individual image design of the volume hologram can be superimposed with an out-of-register, or also registered, endless design of the dark layer, for example an individual flower with a plurality of leaves.

The volume hologram layer is preferably formed from a UV-curing photopolymer.

This is, for example, the Omni DEX 706 photopolymer from Dupont. Further, the use of photopolymers which are present as a liquid substance and are polymerized, and thereby cured, for example by the action of UV light is also possible. It can also be provided to cast the photopolymer as a layer and to precure it by the action of weak UV light or by heat treatment.

It is further expedient if the volume hologram layer has a layer thickness of from 5 μm to 100 μm, preferably from 15 μm to 25 μm.

A sealing wax layer is preferably arranged between the volume hologram layer and the partial opaque layer.

This sealing wax seals or covers the molded surface structures of the surface master.

Furthermore it is advantageous if the sealing wax layer is formed from a UV-curing varnish the refractive index of which deviates from a refractive index of the volume hologram layer by at most 0.2.

The sealing wax layer can thus be cured together with the volume hologram layer, with the result that a particularly good interlayer adhesion results. The small difference in the refractive indices improves the optical properties.

It is further preferred if the decorative ply comprises a color varnish layer. The color varnish layer can be transparent, translucent or opaque.

In the simplest case a design contrasting the volume hologram in terms of color can hereby be already provided in combination with the second areas of the opaque layer.

It is expedient if the color varnish layer comprises at least one dye, pigment, effect pigment, thin-film system, and/or cholesteric liquid crystal system.

The alternative or additional use of UV-luminescent and/or IR-excitable dyes (UV=ultraviolet light; IR=infrared light) and/or pigments in the decorative ply is equally possible. Optically variable effects can thus also be realized in the decorative ply.

The color varnish layer and/or the opaque layer is preferably dyed in a complementary color to a base color of the volume hologram layer.

It is known that volume holograms have a high transparency. However, in many cases, this transparency is not entirely clear and achromatic, instead the volume hologram has, for example, a slightly reddish or pink color impression.

If it is desired to prevent the decorative ply visible through the volume hologram from likewise adopting this color impression (reddish, pink), but for it to have an achromatic white effect instead, it is advantageous to dye the decorative ply with the complementary color in a similar saturation, in order to produce an achromatic color impression for the decorative ply as a result of this additive color mixing. For example, this can be achieved in the case of a reddish volume hologram by dyeing the further layer cyan or turquoise in corresponding saturation. Red and cyan are the complementary colors that complement each other to give white.

In the case of the opaque layer it is likewise possible to proceed by dyeing the dark layer cyan or turquoise correspondingly dark, in order to obtain an achromatic black or gray as a result.

The described additive color mixing can, however, also be used to produce a desired chromatic color shade which forms first due to the color mixing of the color shade of the volume hologram and the color shade of the decorative ply and/or the opaque layer.

Furthermore it is expedient if the decorative ply is or comprises a replication layer, in particular made of a thermoplastic or UV-curing varnish, with a surface relief.

Optically variable or holographic effects which supplement the volume hologram and increase the protection against forgery can hereby also be achieved in the decorative ply.

The surface relief preferably comprises one or more relief structures selected from the group diffractive grating, hologram, blazed grating, linear grating, cross grating, hexagonal grating, asymmetrical or symmetrical grating structure, retroreflective structure, microlens, microprism, zero-order diffraction structure, moth-eye structure or anisotropic or isotropic mat structure, or a superimposition or combination of two or more of the above-named relief structures.

It is expedient if a layer thickness of the replication layer is 1 μm to 5 μm, preferably from 1 μm to 3 μm.

Further it is preferred if the decorative ply comprises a reflective layer.

Such a reflective layer can be discrete and in combination with the second areas of the opaque layer can provide a design contrasting the volume hologram. However, the combination of a reflective layer with a replication layer is particularly advantageous as the structures of the replication layer are thus made particularly visible. The reflective layer is in particular applied directly to the surface relief of the replication layer, in particular by vapor deposition.

The reflective layer is advantageously formed as a metal layer, preferably made of Al, Cu, Ag, Au or alloys of the above-named metals.

The named metals can also be combined with each other in order thus to realize more complex optical impressions.

Alternatively, the reflective layer can also be formed as an HRI (HRI=high refractive index) layer, in particular made of ZnS, $TiO_2$ or $ZrO_2$.

The layer thickness of the reflective layer is expediently from 5 nm to 100 nm, preferably from 10 nm to 50 nm.

Furthermore the multilayer body preferably has an adhesive layer which is arranged on the side of the decorative ply facing away from the opaque layer.

This can be a hot-melt adhesive, a cold adhesive, an optically or thermally activatable adhesive or the like, which allows a fixing of the multilayer body to an object, for example a security document.

A layer thickness of the adhesive layer is expediently from 0.5 μm to 15 μm, preferably from 1 μm to 8 μm.

The multilayer body preferably comprises a substrate, to which the volume hologram layer is applied.

This facilitates, for example, a liquid application of the material of the volume hologram layer and stabilizes it during further processing. The substrate is preferably formed multilayered.

The substrate preferably comprises a carrier ply, in particular made of PET (polyethylene terephthalate), PEN (polyethylene naphthalate) or BOPP (biaxially oriented polypropylene), which is arranged on the side of the substrate facing away from the decorative layer.

Such a carrier ply can preferably be detached before the application of the multilayer body to an object, for example a security document. The carrier ply protects, and thus stabilizes, the multilayer body before its final attachment, in particular during its production and during transport.

A layer thickness of the carrier ply is expediently from 6 μm to 50 μm, preferably from 12 μm to 50 μm.

It is furthermore preferred if the substrate comprises a protective layer, in particular made of a UV-curing varnish, PVC, polyester or an acrylate, which is arranged between the carrier ply and the volume hologram layer.

In contrast to the carrier ply, such a protective layer preferably remains on the multilayer body when the latter is applied to an object, and there forms its outer surface. The protective layer can thus protect the sensitive further layers of the multilayer body from environmental influences, dirt, scratching and the like.

It is expedient if a layer thickness of the protective layer is 0.5 μm to 10 μm, preferably from 2 μm to 5 μm.

In a further embodiment the substrate comprises a detachment layer, in particular made of a strongly filming acrylate, which is arranged between the carrier ply and the protective layer or is also part of the protective layer.

Such a detachment layer facilitates the simple and damage-free detachment during application of the multilayer body to an object.

A layer thickness of the detachment layer is expediently from 100 nm to 2 μm, preferably from 500 nm to 1 μm.

It is further preferred if the substrate comprises an adhesion-promoter layer, in particular made of a mixture of UV-crosslinking monomers, which is arranged between the volume hologram layer and the protective layer.

The interlayer adhesion between the named layers can hereby be increased, with the result that a stable layer bond is obtained.

A layer thickness of the adhesion-promoter layer is preferably from 0.1 μm to 3 μm, particularly preferably from 0.5 μm to 2 μm.

It is preferred if the partial opaque layer and/or the decorative ply is applied by spraying, casting, using a doctor blade, printing, transferring or laminating.

The volume hologram layer is further preferably applied by printing, in particular using a smearing process, e.g. gravure printing (Reverse Gravure) or roll-to-roll screen printing.

It is furthermore advantageous if a volume hologram is introduced into the volume hologram layer, in particular using a holographic copying process to form a transmission or reflection hologram and/or using a master comprising a surface hologram.

In an alternative embodiment the multilayer body has a volume hologram layer and a partial opaque layer, which opaque layer is present in a first area and is not present in a second area. The decorative ply is already present on the substrate, in particular has been printed on and/or stamped on.

For example, the multilayer body has a volume hologram layer and the partial opaque layer. For example, a colored motif, which has light, medium and dark colors, is printed on the substrate in an area. Neighboring and/or overlapping the colored motif, another optically variable element, for example a partially metallized KINEGRAM® or also a thin-film element with a color change effect, is stamped on the substrate. The multilayer body is now applied with the colored motif and the optically variable element overlapping, wherein the partial opaque layer covers the optically variable element and/or the colored motif in areas and leaves them visible only in the second, transparent areas of the opaque layer. The partial opaque layer combined with the colored motif and the optically variable element together act as the background for the volume hologram, wherein the local brilliance of the volume hologram is dependent on the local lightness of the colors of the colored motif and the lightness of the optically variable effect of the optically variable element, which overlap with the volume hologram at the respective local site.

With this combination of the multilayer body with a design present on a substrate, optical effects that are distinctive and at the same time difficult to forge can be produced.

BRIEF DESCRIPTION OF THE DRAWINGS

The invention is now explained in more detail with reference to embodiment examples. There are shown in.

DETAILED DESCRIPTION OF THE INVENTION

Figure 1:
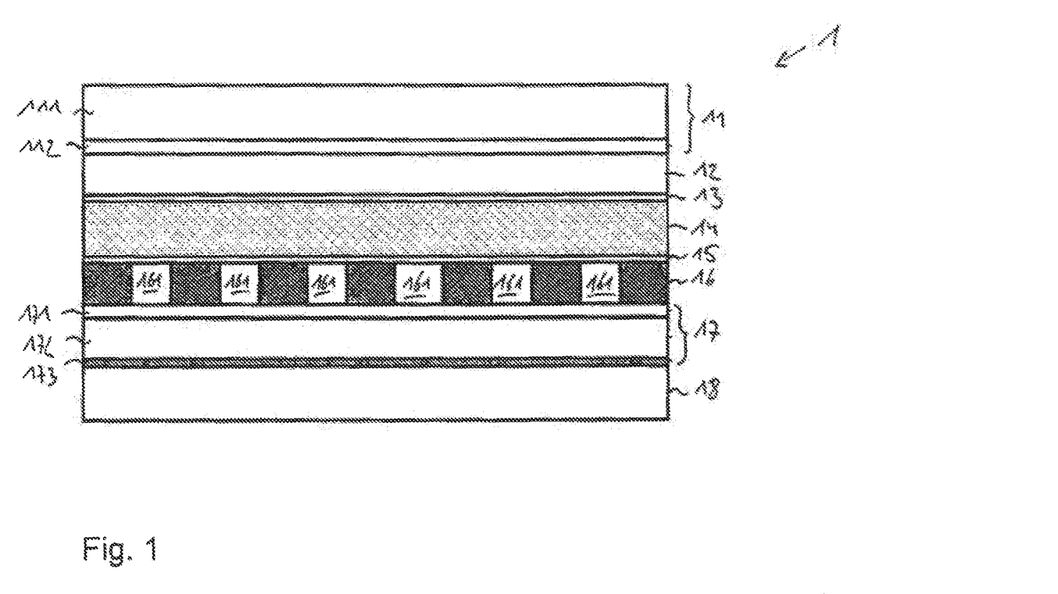
FIG. 1 a schematic sectional representation through an embodiment example of a multilayer body.

A multilayer body labeled 1 as a whole, for use as a security element, is shown in cross section in FIG. 1 and comprises a substrate 11, to which a protective varnish layer 12 is applied. The substrate 11 is itself constructed multilayered and comprises a carrier ply 111 and a detachment layer 112.

An adhesion-promoter layer 13, on which a volume hologram layer 14 is in turn arranged, is constructed on the protective varnish layer 12. This volume hologram layer is provided with a sealing wax layer 15 on its side facing away from the substrate 11. A partial opaque varnish layer 16, which has transparent openings 161, is applied to the sealing wax 15. A decorative ply 17, which in the embodiment example shown in FIG. 1 comprises a transparent varnish layer 171, a replication varnish layer 172 and a reflective layer 173, adjoins the side of the opaque varnish layer 16 away from the substrate.

Finally, another adhesive layer 18, by means of which the multilayer body 1 can be applied to an object, for example a security document, is applied to the surface of the decorative ply 17 facing away from the substrate 11.

The carrier ply 111 of the multilayer body is preferably formed as a film made of PET and is preferably between 6 μm and 50 μm thick. The film is expediently transparent to laser radiation, which is used to imprint the volume hologram into the volume hologram layer 14.

The detachment layer 112 is optional and consists, for example, of wax components. A detachment layer 112 is used if the carrier ply 111 is to be removed from the multilayer body 1 after application to an object. This is the case, for example, when the multilayer body 1 is formed as a hot-embossing film. In the case of multilayer bodies 1 formed as laminating films, the carrier ply remains on the multilayer body, with the result that a detachment layer can be dispensed with.

The protective layer 12 can also achieve a separating effect with respect to the carrier ply 111 and can make a separate detachment layer superfluous. The protective layer can in this case, for example, consist of a UV-curing or thermoplastic varnish. Suitable protective varnishes are, for example, formulated on the basis of PVC, polyester or acrylates and are preferably 1 μm to 10 μm thick. After detachment of the carrier ply 111 the protective layer 12 protects the multilayer body from environmental influences, scratching and the like.

The protective layer can also be designed multilayered. For example, the protective layer has three layers of acrylate, wherein the first partial layer is a high-molecular-weight thermoplastic acrylate, the second partial layer is an acrylate crosslinking with isocyanate (NCO) and the third layer is a high-molecular-weight thermoplastic acrylate.

The adhesion-promoter layer 13 improves the adhesion between the protective layer 12 and the volume hologram layer 14. It is preferably constructed from a mixture of UV-crosslinking monomers and has a layer thickness of from 0.1 μm to 3 μm, preferably from 0.5 μm to 2 μm.

The volume hologram layer 14 is constructed from a photopolymer, which is, for example, the Omni DEX 706 photopolymer from Dupont. Further, the use of photopolymers which are present as a liquid substance and are polymerized, and thereby cured, for example by the action of UV light is also possible. It can also be provided to cast the photopolymer as a layer and to precure it by the action of weak UV light or by heat treatment.

The application of the volume hologram layer preferably takes place by means of a printing process, preferably by means of a smearing process. The photopolymer here is preferably in a layer thickness of from 5 to 100 μm, further preferably in a layer thickness of approximately 20 μm.

The illumination of the volume hologram preferably takes place with the aid of a surface master. Further, it is also possible for a volume hologram to be used as volume hologram master instead of a master provided with a surface relief and for the recording of the volume hologram in the volume hologram layer to take place using a usual, holographic copying process to form a transmission or reflection hologram in the volume hologram layer 14.

The volume hologram layer 14 is UV-curing, with the result that the protective layer 12 is preferably also designed to be UV-curing, in order to achieve a particularly good adhesion. If the protective layer is thermoplastic, the adhesion-promoter layer 13 arranged between protective layer 12 and volume hologram 14 is advantageous in particular.

The volume hologram layer 14 is covered by a sealing wax layer 15 on its side facing away from the substrate 11. This sealing wax is, like the volume hologram layer, UV-curing and seals the molded surface structures of the surface master in the volume hologram layer 14. The sealing wax has a largely identical refractive index to the volume hologram or deviates from it by not more than 0.2.

The opaque varnish layer 16 consists of a pigmented varnish which is as opaque as possible and is preferably thermoplastic. It is applied using gravure printing or screen printing and is 1 μm to 5 μm thick.

It is preferred if the opaque layer has a luminance L* in the CIELAB color space of from 0 to 50, preferably from 0 to 30.

The luminance L* of the opaque layer is 16 determined in particular by means of the CIELAB Datacolor SF 600 measuring system, which is based on a spectrophotometer. In the colorimetric determination of color differences in body colors according to the CIELAB formula L*a*b*, the value L* represents the light/dark axis, the value a* represents the red/green axis and the value b* represents the yellow/blue axis. The L*a*b* color space is thus described as a three-dimensional coordinate system, wherein the L* axis describes the lightness and can adopt a value between 0 and 100.

The measurement of the lightness L* preferably takes place under the following conditions:
Measurement geometry: diffuse/8° according to DIN 5033 and ISO 2496
Diameter of measurement opening: 9 mm
Spectral range: 360 nm-700 nm according to DIN 6174
Standard illuminant: D65

The openings 161 in the opaque layer 16 form a graphic element, in particular a motif, an image, a symbol, a logo and/or an alphanumeric character.

This graphic element contributes to the overall design of the multilayer body 1 and thus increases the protection against forgery. Depending on the relative arrangement and formation of the layers, this element can be visible together with the volume hologram or can be dependent on the angle of observation independently of this.

The graphic element preferably comprises an endless motif and/or an individual image motif.

The graphic element can be arranged registered relative to a graphic element of the volume hologram layer.

The openings 161 in the opaque layer 16 are either a continuous endless pattern or an individual image decoration or a combination thereof. The openings can (but need not) be arranged registered relative to the motif of the volume hologram.

The volume hologram can, for its part, likewise have either a continuous endless pattern or an individual image decoration or a combination thereof.

Optionally another translucent color varnish layer 171 can be applied to the opaque layer 16 in order to dye the subsequent layers with their optical effect.

In order to realize further optically variable diffractive or refractive structures, the decorative ply 17 comprises a replication varnish layer 172 with a surface relief. This is thermoplastic or UV-curing and 1 μm to 5 μm thick. The material of the replication varnish layer 172 is preferably highly transparent.

The surface relief preferably comprises one or more relief structures selected from the group diffractive grating, hologram, blazed grating, linear grating, cross grating, hexagonal grating, asymmetrical or symmetrical grating structure, retroreflective structure, microlens, microprism, zero-order diffraction structure, moth-eye structure or anisotropic or isotropic mat structure, or a superimposition of two or more of the above-named relief structures.

A reflective layer 173 made of metal, preferably of Al, Cu, Ag, Au or of alloys of the above-named metals, which serves to make the diffractive structures of the replication varnish layer 172 visible, is vapor-deposited directly onto the replication varnish layer 172. Alternatively an HRI (high refractive index) layer, in particular made of ZnS, $TiO_2$ or $ZrO2$, is also possible. Alternatively a varnish layer with metallic pigments can also be provided.

The layer thickness of the reflective layer is expediently from 5 nm to 100 nm, preferably from 10 nm to 50 nm.

A single- or multilayer adhesive layer 18, which can be formed thermoplastic, UV-curing or thermally curing, is applied to the reflective layer 17. Different partial layers of the adhesive layer can fulfill different functions, for example to promote adhesion to neighboring layers or to the object to which the multilayer body is to be applied. A function as a barrier layer against the diffusion of substances from and/or into neighboring layers is also possible.

Exemplary designs of multilayer bodies of this type are shown in top view in FIGS. 2 to 7.

Figure 2:
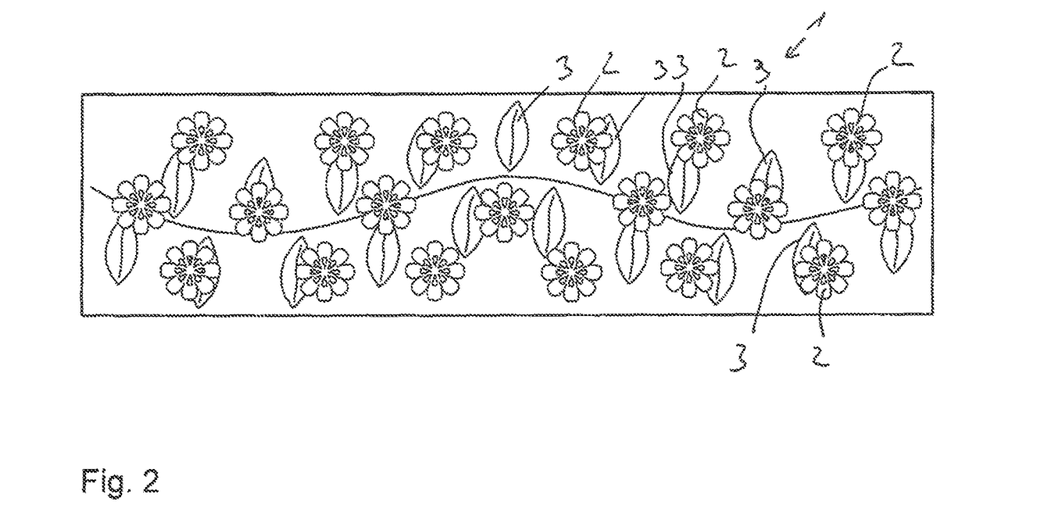
FIG. 2 a schematic representation of a design of an embodiment example of a multilayer body.

FIG. 2 shows a multilayer body 1 with two out-of-register, continuous endless decorations which are not matched to each other, but are superimposed randomly. In this embodiment example the flowers 2 are realized in the volume hologram. The volume hologram can show either only the outlines or also a two-dimensional flower, or also both. The leaves 3 in the decoration are realized through the openings 161 in the opaque layer 16. Here too, the opening can represent either the outline or also the entire leaf surface area.

Figure 3:
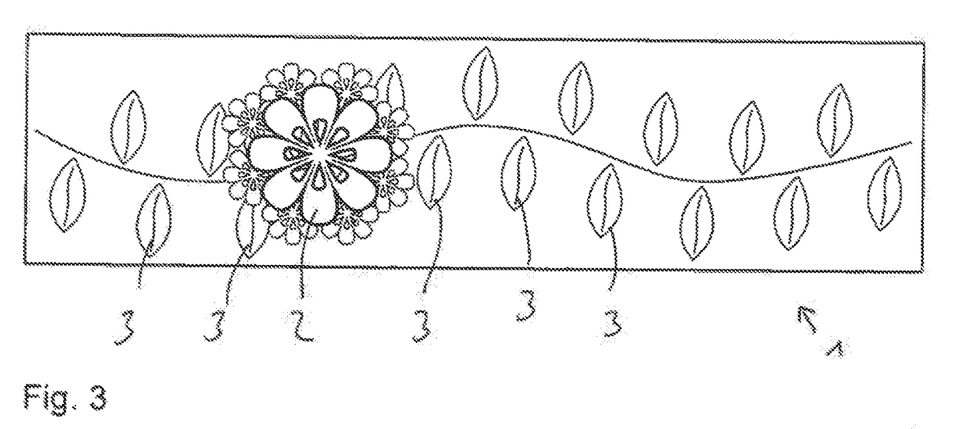
FIG. 3 a schematic representation of a design of a further embodiment example of a multilayer body.

As FIG. 3 shows, an individual image, here the flower 2, in the volume hologram can also be combined with an endless decoration, here the leaves 3, in the opaque layer 16. The individual image is designed registered relative to the substrate, the endless decoration is designed out-of-register relative to the substrate and also to the individual image.

Figure 4:
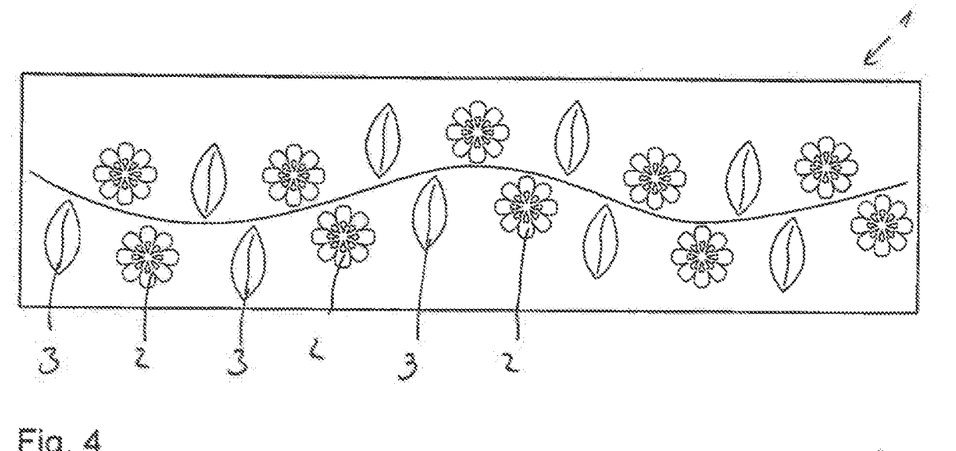
FIG. 4 a schematic representation of a design of a further embodiment example of a multilayer body.
Figure 5:
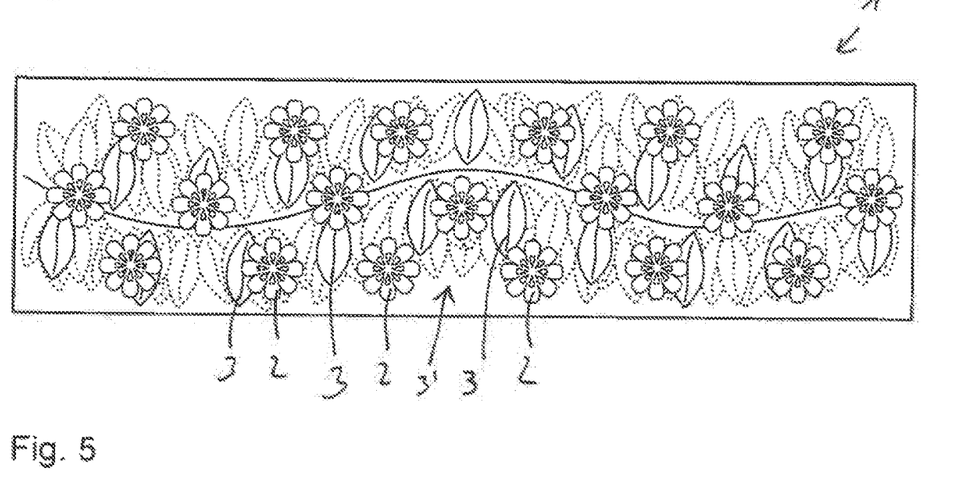
FIG. 5 a schematic representation of a design of a further embodiment example of a multilayer body.

A registered arrangement of the decorations is also possible, as FIG. 4 shows. The relative position of the two decorations is aligned relative to each other such that the two decorations together form an overall decoration. In other words, in practice, the flowers 2 in each case are to be arranged in gaps between the leaves 3. Here too, the flowers 2 of the decoration are formed by the volume hologram layer 14, while the openings 161 in the opaque layer 16 form the leaves 3.

The opaque layer 16, alone or in combination with the decorative ply 17, can also form more complex structures. In the embodiment example according to FIG. 5 the opaque layer 16 has a decoration consisting of several dark colors (represented dotted), which can interact with the two other decorations or with them can form an overall decoration. Here a leaf motif 3', which is combined with openings 161 which are likewise formed in the shape of leaves 3, is thus provided on the dark layer.

Figure 6:
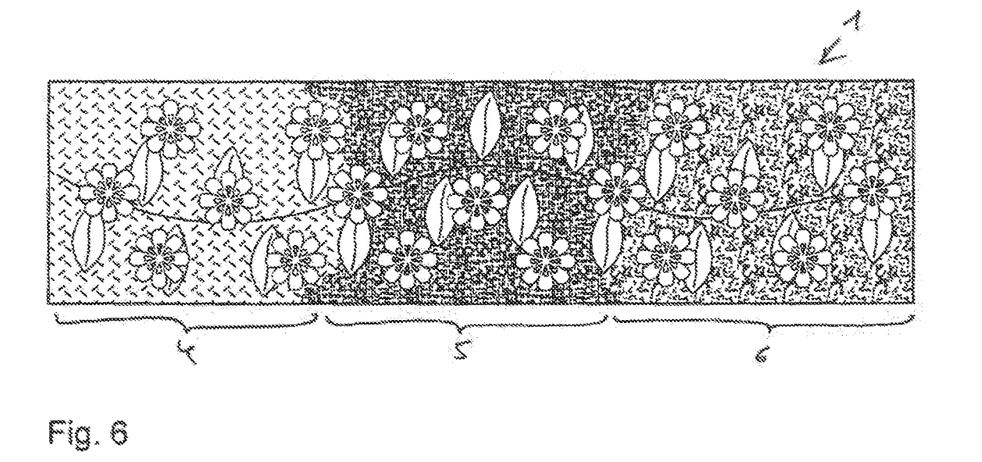
FIG. 6 a schematic representation of a design of a further embodiment example of a multilayer body.

The decoration of the multilayer body 1 can furthermore vary in sections, as represented in FIG. 6. Here the design of the opaque layer 16 and the decorative ply 17 varies in the three partial areas 4, 5, 6 of the multilayer body 1.

It is also possible to omit the decorative ply 17 and also the opaque layer 16 completely in a section, in order to design the volume hologram 14 transparent in this section. For example, the volume hologram 14 in this section then lies on a light background made of white paper or plastic of the substrate 11, which is covered in the other sections by the opaque layer 16 and the decorative ply 17. Specific optical effects can thereby be produced by the volume hologram 14 being present with a lower brilliance of the optical effects in the omitted section than in the neighboring sections, where the volume hologram 14 is present a higher brilliance brought about by the opaque layer 16 and the decorative ply 17. In particular due to design elements of the volume hologram 14 overlapping both sections, these design elements can be altered locally in terms of their brilliance due to the different background. For example, a continuous line of the volume hologram 14 can have a low brilliance in one section and a high brilliance in the neighboring section, wherein both line sections are arranged totally positionally accurate relative to each other.

It is also possible for the decorative ply 17 in a section to be omitted in the second areas 161 of the opaque layer 16 in which the opaque layer is not present, in order to leave the substrate 11 visible in these areas. In other words, the substrate 11 forms the background for the volume hologram 14. If, for example, the substrate 11 is light, in particular white, paper or plastic, the brilliance of the volume hologram 14 is accordingly lowered or reduced.

However, the substrate 11 can also already have color layers or other decorative layers, which are then at least partially visible through the second areas 161 of the opaque layer 16 and through the transparent volume hologram 14 and likewise form a background for the volume hologram 14. Due to the substrate 11 shining through the second areas 161 of the opaque layer 16, optical effects that are distinctive and at the same time difficult to forge can in turn be produced.

Figure 7:
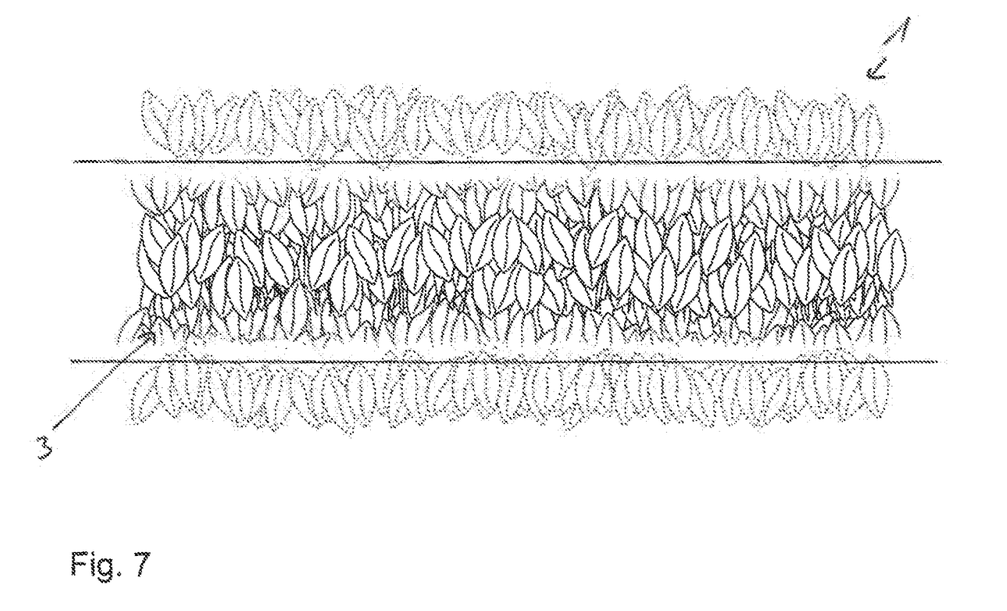
FIG. 7 a schematic representation of a design of a further embodiment example of a multilayer body.

In FIG. 7 a further embodiment example is shown in which, for the sake of clarity, only the decoration of the opaque layer 16 is shown and the likewise present decorations of the volume hologram layer 14 and the openings 161 in the opaque layer 16 are not represented.

The decoration of the opaque layer 16 (represented with continuous lines) can interact or be combined with a further decoration on the object to which the multilayer body 1 is applied (further decoration represented dotted). The horizontal lines show the outer edges of a strip of film formed by the multilayer body 1.

For example, the opaque layer 16 can end transparently towards the edge of the strip of film and gradually expose a printed motif located underneath and/or next to the strip of film.

In this example, the opaque layer 16 has a motif of leaves 3, which increases in transparency towards the edge of the multilayer body 1. The object to which the multilayer body 1 is to be applied likewise has a leaf motif, and the two leaf motifs form an overall representation.

LIST OF REFERENCE NUMBERS

1 multilayer body
11 substrate
111 carrier ply
112 detachment layer
12 protective layer
13 adhesion-promoter layer
14 volume hologram layer
15 sealing wax layer
16 opaque layer
161 openings
17 decorative ply
171 color varnish layer
172 replication varnish layer
173 reflective layer
18 adhesive layer
2 flowers
3 leaves
4, 5, 6 areas

The invention claimed is:

1. A security document with a security element comprising a multilayer body, the multilayer body comprising:
    a volume hologram layer; and
    a partial opaque layer, arranged on a surface of the volume hologram layer, which is present in a first area and is not present in a second area,
    wherein the partial opaque layer comprises an opaque varnish with transparent openings, the opaque varnish being present in the first area and is not present in the second area, and
    wherein the partial opaque layer has a luminance L* in the CIELAB color space of from 0 to 50.

2. The security document according to claim 1, wherein the security document comprises a substrate with a decorative ply, to which the security element is applied.

3. The security document according to claim 2, wherein the decorative ply of the security document comprises a transparent color varnish layer.

4. The security document according to claim 3, wherein the color varnish layer comprises at least one dye, pigment, effect pigment, thin-film system, and/or cholesteric liquid crystal system.

5. The security document according to claim 3, wherein the color varnish layer is dyed in a complementary color to a base color of the volume hologram layer of the security element.

6. The security document according to claim 2, wherein the decorative ply of the security document is or comprises a replication layer, with a surface relief.

7. The security document according to claim 6, wherein the surface relief comprises one or more relief structures selected from the group: diffractive grating, hologram, blazed grating, linear grating, cross grating, hexagonal grating, asymmetrical or symmetrical grating structure, retroreflective structure, microlens, microprism, zero-order diffraction structure, moth-eye structure or anisotropic or isotropic mat structure, or a superimposition or combination of two or more of the above-named relief structures.

8. The security document according to claim 7 wherein a layer thickness of the replication layer is 1 µm to 5 µm.

9. The security document according to claim 6, wherein the replication layer is made of a thermoplastic or UV-curing varnish.

10. The security document according to claim 2, wherein the decorative ply of the security document comprises a reflective layer.

11. The security document according to claim 10, wherein the reflective layer is formed as a metal layer.

12. The security document according to claim 11, wherein the metal layer comprises Cu, Ag, Au or an alloy thereof.

13. The security document according to claim 10, wherein the reflective layer is formed as an HRI (high refractive index) layer.

14. The security document according to claim 13, wherein the HRI layer comprises ZnS, $TiO_2$ or $ZrO_2$.

15. The security document according to claim 10, wherein a layer thickness of the reflective layer is from 5 nm to 100 nm.

16. The security document according to claim 15, wherein the layer thickness of the reflective layer is from 10 nm to 50 nm.

17. The security document according to claim 1, wherein the multilayer body further comprises a decorative ply, wherein the partial opaque layer is arranged between the volume hologram layer and the decorative ply.

* * * * *